(12) United States Patent
Gu et al.

(10) Patent No.: US 7,559,386 B2
(45) Date of Patent: Jul. 14, 2009

(54) VEHICLE HYBRID PROPULSION SYSTEM

(75) Inventors: Huan-Lung Gu, Hsinchu Hsien (TW);
Tseng-Teh Wei, Hsinchu Hsien (TW);
Chun-Hsien Lu, Hsinchu Hsien (TW);
Shian-Hsuan Huang, Hsinchu Hsien (TW); Li-Ju Cheng, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/489,633

(22) Filed: Jul. 20, 2006

(65) Prior Publication Data
US 2007/0137911 A1 Jun. 21, 2007

(30) Foreign Application Priority Data
Dec. 19, 2005 (TW) .............................. 94145008 A

(51) Int. Cl.
*B60K 1/00* (2006.01)
*B60K 6/20* (2006.10)
*B60K 6/42* (2006.10)
*B60K 6/44* (2006.10)
*B60K 6/442* (2006.10)
*F16D 19/00* (2006.01)
*F16D 27/00* (2006.01)

(52) U.S. Cl. ................. 180/65.1; 192/84.93; 180/65.21; 180/65.22; 180/65.225; 180/65.23

(58) Field of Classification Search ................. 192/995, 192/84.93; 903/904, 905, 906, 912, 913, 903/914; 180/65.1, 65.2, 65.3, 65.4
See application file for complete search history.

(56) References Cited

U.S. PATENT DOCUMENTS

| | | | | | |
|---|---|---|---|---|---|
| 5,993,350 | A | * | 11/1999 | Lawrie et al. | 477/5 |
| 6,026,921 | A | * | 2/2000 | Aoyama et al. | 180/65.2 |
| 6,059,059 | A | * | 5/2000 | Schmidt-Brucken | 180/65.3 |
| 6,319,167 | B1 | * | 11/2001 | Yoshida et al. | 477/5 |
| 6,341,584 | B1 | * | 1/2002 | Itoyama et al. | 123/90.15 |
| 6,481,517 | B1 | | 11/2002 | Kobayashi et al. | |
| 6,589,130 | B1 | * | 7/2003 | Baginski et al. | 477/3 |
| 6,729,423 | B2 | | 5/2004 | Kobayashi et al. | |
| 6,809,429 | B1 | * | 10/2004 | Frank | 290/40 C |
| RE39,205 | E | * | 7/2006 | Sasaki | 318/150 |
| 2003/0064854 | A1 | * | 4/2003 | Kotani | 477/3 |

FOREIGN PATENT DOCUMENTS

| | | |
|---|---|---|
| JP | 58142378 | 8/1983 |
| JP | 28516 | 1/1990 |
| JP | 10148142 | 6/1998 |

(Continued)

*Primary Examiner*—Christopher P Ellis
*Assistant Examiner*—John R Olszewski
(74) *Attorney, Agent, or Firm*—Rabin & Berdo, P.C.

(57) ABSTRACT

A vehicle hybrid propulsion system includes an internal combustion engine, a transmission, a plate clutch, and at least one electric actuator coupled with the engine and with the transmission for being able to perform one of the operations consisting of generating propulsive forces, generating electric power and idling. A lever mechanism driven by an electric motor is used to control engaging and disengaging of the plate clutch such that connection between the transmission and the engine and/or the electric motor can be established or blocked. Thus, hybrid propulsion systems having different functions can be formed. Moreover, the hybrid propulsion systems are easy to implement by combining modular components.

11 Claims, 6 Drawing Sheets

FOREIGN PATENT DOCUMENTS

| | | |
|---|---|---|
| JP | 10309003 | 11/1998 |
| JP | 2001263389 | 9/2001 |
| JP | 2003276478 | 9/2003 |
| JP | 2004-346967 | 12/2004 |
| JP | 200536818 | 2/2005 |
| JP | 2005273875 | 10/2005 |
| JP | 2005273875 A * | 10/2005 |
| JP | 2005-312295 | 11/2005 |
| JP | 2005313786 | 11/2005 |
| JP | 2005315358 | 11/2005 |
| TW | 390939 | 5/2000 |
| TW | 487779 | 5/2002 |

* cited by examiner

VEHICLE HYBRID PROPULSION SYSTEM

BACKGROUND OF THE INVENTION

1. Field of the Invention

The present invention relates generally to hybrid propulsion systems, and more particularly, to a vehicle hybrid propulsion system.

2. Description of Related Art

Generally, a vehicle propulsion system comprises a startup and power generating device so as to start an engine, provide required power to electric loads during operation of the engine or charge battery of the vehicle.

Such a device is disclosed by Japanese patent publication No. 10-148142. A startup coil and a power generating coil are disposed on a stator of a motor. In the case of start, electric power is provided to the startup coil by a battery so as to use the motor as a startup device. The motor as a startup device is directly connected to a crankshaft and drives the crankshaft to rotate, thereby starting up the engine. On the other hand, the commutator and the electric brush mechanism of the motor are in contact with each other through an adjusting mechanism. After the engine is started up, the rotation speed of the engine begins to increase. The rotation of the engine further propels the rotor of the motor to rotate. When the rotation speed of the rotor reaches a predefined value, the centrifugal force of the rotor actuates the adjusting mechanism, thereby cutting off the contact between the commutator and the electric brush mechanism. Thereafter, the motor is used as a power generating device for providing electric-motive forces to electric loads of the vehicle and charging the battery.

With further development of the vehicle industry, there has been proposed an assist hybrid propulsion system that integrates an engine with an assist propulsion device for providing propulsive forces to a vehicle. As disclosed in Taiwan patent publication No. 390939, an engine startup and assist device is used to start up the engine and provide torque assist for the engine such as when the vehicle climbs or needs to deliver a large torque.

With upcoming energy crisis and environment protection concern, current widely used hybrid propulsion system introduces an automatic Stop-Go function such as disclosed by Taiwan patent No. 487779 and Japanese publication No. 58-142378. Through the automatic Stop-Go function, the engine can be stopped when the vehicle stops and the engine stays at an idle state. The engine can then be automatically ignited to start up when the vehicle starts to go, thereby saving energy and decreasing air pollution. In addition, a full-function hybrid propulsion system has been developed, which can separately utilize propulsive forces of the engine or the electric motor. Therefore, the electric motor not only can provide assist propulsive forces to the engine, it also can independently provide propulsive forces to the vehicle according to the need, and meanwhile automatically stop the engine.

Most of the hybrid propulsion systems use a torque converter or planetary gear for propulsive force connection, only a small number of hybrid propulsion systems use a plate clutch for propulsive force connection. Meanwhile, currently, only the assist hybrid propulsion system connects the electric motor to the crankshaft of the engine directly such that the electric motor and the engine can rotate coaxially and synchronously. For example, an assist hybrid propulsion system disclosed by U.S. Pat. No. 6,729, 423 B2 controls a plate clutch through oil pressure. That is, an oil hydraulic pump drives an oil hydraulic cylinder to operate the clutch plate. Compared with a system that controls the plate clutch through a lever mechanism, the assist hybrid propulsion system of the above-mentioned invention is costly, and is difficult to assemble and maintain. Further, its operation speed is slow. In addition, the design of the plate clutch is space-consuming and its assembling position is difficult to be changed. Therefore, it is difficult to realize modular manufacturing flexibility.

SUMMARY OF THE INVENTION

Accordingly, an objective of the present invention is to provide a vehicle hybrid propulsion system that can obtain different functions by changing arrangement of modular components constituting the vehicle hybrid propulsion system.

Another objective of the present invention is to provide a low cost vehicle hybrid propulsion system.

A further objective of the present invention is to provide a vehicle hybrid propulsion system that is easy to maintain.

Still another objective of the present invention is to provide a vehicle hybrid propulsion system that can increase operation speed of separation and connection between propulsive forces of engine and electric motor.

In order to attain the above and other objectives, a vehicle hybrid propulsion system of the present invention comprises: an internal combustion engine; a transmission; a plate clutch having a level mechanism driven by an electric actuator for separating the plate clutch from the engine or coupling the plate clutch with the engine; and at least one electric actuator coupled with the engine and with the transmission for being able to perform one of the operations consisting of generating propulsive forces, generating electric power and idling. The lever mechanism comprises a push rod driven by the electric actuator, a lever propelled by the push rod, and a thrust ring propelled by the lever and capable of exerting forces on the plate clutch. The vehicle hybrid propulsion system further comprises an electronic controller for making the electric actuator perform one of the operations consisting of generating propulsive forces, generating electricity and idling. The electronic controller further controls forward and reverse cycling of the electric actuator so as to move vehicle forward or backward. The transmission is one of a manual transmission and an automatic transmission.

In order to attain same objectives, another vehicle hybrid propulsion system disclosed by the present invention comprises: an internal combustion engine; a transmission; a first electric actuator coupled with the engine for providing propulsive forces or generating electric power; a second electric actuator coupled with the transmission for generating propulsive forces or generating electric power; and a plate clutch disposed between the first and second electric actuators having a lever mechanism driven by an electric actuator for separating the engine and the first electric actuator from the second electric actuator or coupling the engine and the first electric actuator with the second electric actuator. The vehicle hybrid propulsion system further comprises an electronic controller for making the first and second electric actuators perform one of the operations consisting of generating propulsive forces, generating electricity and idling. The electronic controller can further control forward and reverse cycling of the second electric actuator so as to move vehicle forward or backward. The transmission is one of a manual transmission and an automatic transmission. The lever mechanism comprises a push rod driven by an electric actuator, a lever propelled by the push rod via a fulcrum, and a thrust ring propelled by the lever and capable of exerting forces on the plate clutch.

According to the hybrid propulsion system of the present invention, an electric motor is used to drive the lever mechanism of the plate clutch. Thus, connection between the sources of propulsive forces and the transmission, or connection between different sources of propulsive forces such as between the engine and the electric motor can be separated or reunited automatically, thereby achieving different hybrid propulsion systems having different functions. Meanwhile, the hybrid propulsion systems can easily be constructed with modular components, and the plate clutch is an already known and low cost mechanism. Therefore, a low cost hybrid propulsion system with simple structures and multi functions can be achieved so as to save fuel, enhance output power and obtain optimal operation performance.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
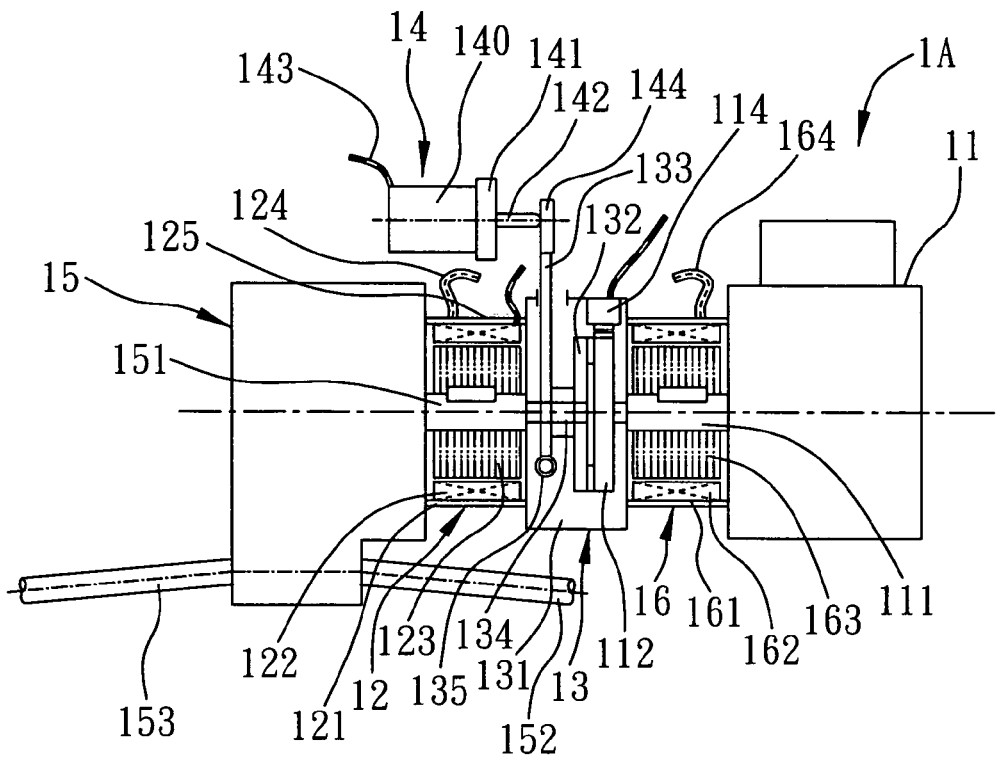
FIG. 1 is a diagram of a hybrid propulsion system according to a first embodiment of the present invention.
Figure 2:
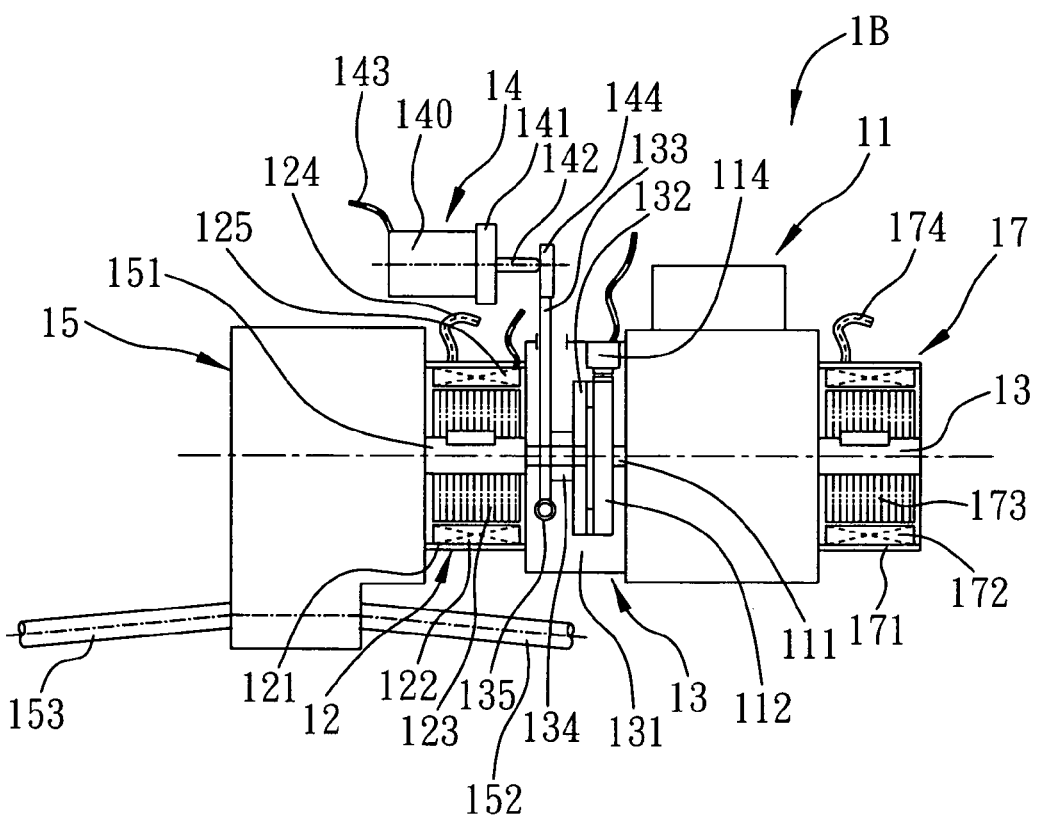
FIG. 2 is a diagram of a hybrid propulsion system according to a second embodiment of the present invention.
Figure 3A:
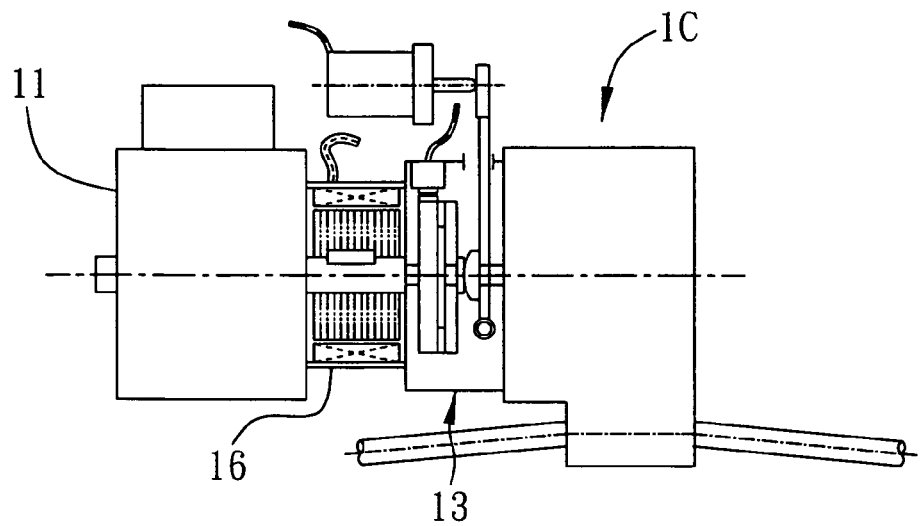
FIGS. 3A and 3B are diagrams of a hybrid propulsion system according to a third embodiment of the present invention.
Figure 3B:
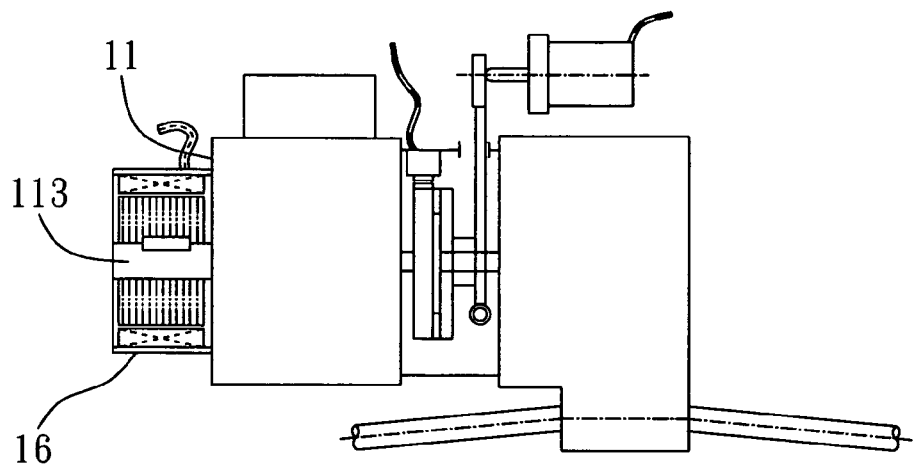
Figure 4:
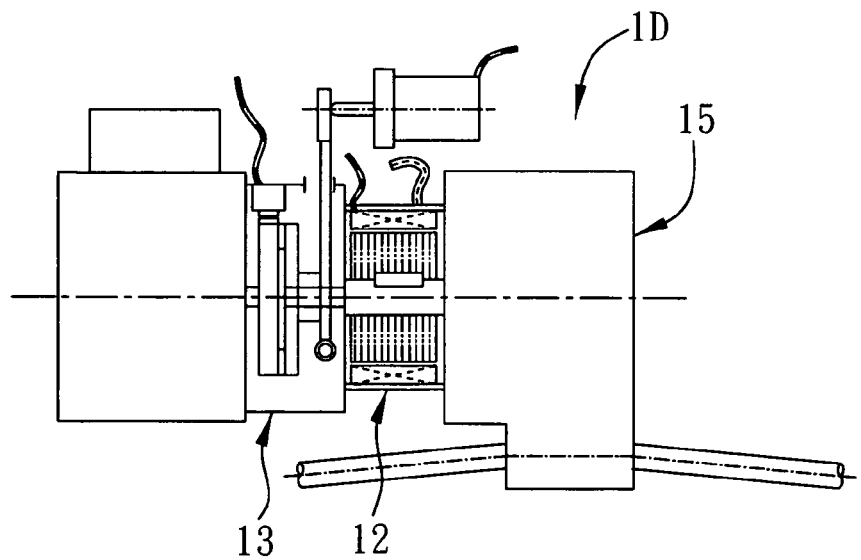
FIG. 4 is a diagram of a hybrid propulsion system according to a fourth embodiment of the present invention.

FIGS. 1 to 4 respectively show a first, second, third and fourth embodiment of the present invention. Therein, vehicle hybrid propulsion systems shown in FIGS. 1, 2 and 4 are full functional, i.e., propulsive forces of an engine 11 and an electric motor 12 can be outputted separately or outputted after combination; and vehicle hybrid propulsion system shown in FIGS. 3A and 3B is an assist hybrid propulsion system, i.e., propulsive forces are mainly outputted by an engine 11 while assisted by the propulsive forces of an electric motor 16, and propulsive forces of the electric motor 16 can not be outputted independently.

Referring to FIG. 1, a hybrid propulsion system 1A shown according to a first embodiment of the present invention. The hybrid propulsion system 1A comprises an engine 11, which can be stopped, be idling or generate propulsive forces. Therein, propulsive forces generated by the engine 11 can be outputted through an output shaft 111 of the engine 11. The output shaft 111 of the engine 11 functions as a rotation axis of a rotor 163 of an electric motor 16 such that the rotor 163 can rotates coaxially and synchronously with the output shaft 111 of the engine 11. The electric motor 16 further comprises a stator 162 disposed around the rotor 163 and inside the casing 161 of the electric motor 16. The stator 162 transmits electric power through a power line 164. Controlled by an electronic controller, the electric motor 16 can function as an electric generator that receives mechanical rotation energy and converts it into electric energy, or function as a motor that converts electrical energy of a battery into rotation energy, or stay at an idle state.

One end of the casing 161 of the electric motor 16 is fixed to the engine 11, and the other end of the casing 161 is connected to a housing 131 of a plate clutch assembly 13. The end of the output shaft 111 of the engine 11 is connected to one side of a flywheel 112. The other side of the flywheel 112 is connected to a plate clutch 132. Both the flywheel 112 and the plate clutch 132 are accommodated inside the housing 131. The plate clutch 132 is a good hybrid propulsion connecting component. By accurately controlling disengaging and engaging of the plate clutch 132 so as to prevent occurrence of impact torsion, the plate clutch 132 can be operated normally. A position sensor 114 is mounted to the housing 131 for sensing the outer circumference of the flywheel 112 such that a position sensing signal can be generated. The position sensing signal is used to provide a timing signal required for controlling the electric motor 16.

The plate clutch 132 is connected to the front end of an input shaft 151 of a transmission 15. In general, the plate clutch 132 is kept at an engaged state, that is, propulsive forces of the engine 11 and electric motor 16 can be transmitted to the input shaft 151 of the transmission 15 through the flywheel 112 and the plate clutch 132. The propulsive forces are then shifted by the transmission 15 and outputted to loads through output shafts 152, 153 of the transmission 15.

Another electric motor 12 is disposed between the plate clutch assembly 13 and the transmission 15. The electric motor 12 comprises a casing 121, a stator 122 inside the casing 121 and a rotor 123 enclosed by the stator 122. Therein, the rotor 123 is disposed on the input shaft 151 of the transmission 15 and rotates coaxially and synchronously with the input shaft 151. The power line 124 is used to transmit electric power for the electric motor 12. Another position sensor 125 is used to sense the timing signal of the rotating axis so as to generate a position sensing signal for controlling the electric motor 12.

Controlled by an electronic controller, the electric motor 12 can function as an electric generator that receives mechanical rotation energy and converts it into electric energy, or function as a motor that converts electrical energy of a battery into rotation energy, or stay at an idle state. Since the electric motor 12 can be braked quickly while generating electricity and quickly go into an idle state, and have a low inertia mass, even if the electric motor 12 is not connected to the clutch, the generated impact torsion is small. Therefore, the electric motor 12 can be directly connected to the transmission 15, which is an advantage of the present invention. When the electric motor 12 performs as an electric motor, propulsive forces generated by the electric motor 12 are exerted on the input shaft 151 and combined with propulsive forces of the engine 11 and electric motor 16 so as to form hybrid propulsive forces.

Outside the plate clutch assembly 13 there is disposed a electric actuator 14, which comprises a motor 140 and an actuating mechanism 141. The electric actuator 14 is used to drive a push rod 142. The push rod 142 further propels a lever 133. By using a fulcrum 135 as a supporting point, the lever 133 further propels a thrust ring 134 that directly exerts forces on the plate clutch 132. When the motor 140 exerts forces, the plate clutch 132 will be propelled by the thrust ring 134 and go into a disengaged state until the reactive force of the plate clutch 132 is balanced with the thrust force of the thrust ring 134. At this point, the plate clutch assembly 13 is switched into a disengaged state, and propulsive forces of the engine 11 and the electric motor 16 will be prevented from being transmitted to the input shaft 151 through the flywheel 112 and the plate clutch 132. Instead, only propulsive forces of the electric motor 12 can be transmitted to the input shaft 151 and further processed by the transmission 15. On the other hand, when the motor 140 stops exerting forces, forces exerted on the lever 133 will be reduced. The restoring forces of the plate clutch 132 are bigger than the propulsion forces exerted on the thrust ring 134 by the lever 133. Therefore, the plate clutch 132 gradually moves into an engaged state.

The electric actuator 14 is actuated by electric power transmitted through the power line 143. The electric actuator 14 further comprises a position sensor 144 for measuring the moving position of the push rod 142, thereby controlling the moving position of the thrust ring 134 and the plate clutch 132. Thus, the electric actuator 14 can indirectly sense the state of the plate clutch 13. As a result, through special time functions between forces and loosening speed of the electric actuator 14, the plate clutch 132 can smoothly go to an engaged or disengaged state, thereby preventing impact torsion generated during combination of different propulsive forces. The functions of such a hybrid propulsion system 1A are described as follows.

When the plate clutch assembly 13 is at a disengaged state, the electric motor 12 can be used to generate propulsive forces. The propulsive forces are then shifted by the transmission 15 and further transmitted to loads. At this point, only a single kind of propulsive forces is provided to the vehicle for use at low speed with low load, no matter the engine 11 is stopped, idling, or generating propulsive forces.

When the plate clutch assembly 13 is at a disengaged state, the electric motor 12 generates reverse propulsive forces. The reverse propulsive forces are then shifted by the transmission 15 and further transmitted to loads. At this point, only a single kind of propulsive forces is provided to the vehicle for backing the vehicle at low speed with low load, no matter the engine 11 is stopped, idling, or generating propulsive forces. Thus, the transmission 15 does not need a backing mechanism.

When the plate clutch assembly 13 is at a disengaged state and the engine 11 is stopped, the electric motor 16 generates propulsive forces, and the propulsive forces further start up the engine 11 and make the engine 11 idle or generate propulsive forces, no matter the electric motor 12 functions as an electric generator, an electric motor or stays at an idle state.

When the plate clutch assembly 13 is at a disengaged state, propulsive forces of the engine 11 propels the electric motor 16 to generate electric power so as to charge the battery, no matter the electric motor 12 functions as an electric generator, an electric motor or stays at an idle state.

When the plate clutch assembly 13 is at a disengaged state, the electric motor 12 functions as an electric generator, which converts inertia forces generated while decreasing the vehicle speed or residual propulsive forces while braking the vehicle into electric power so as to charge the battery, no matter the engine 11 is stopped, idling, or generating propulsive forces.

When the plate clutch assembly 13 is at an engaged state, propulsive forces of the engine 11 is outputted to the transmission 15, shifted by the transmission 15 and then transmitted to loads as a single kind of propulsive forces to be used in the vehicle at different speed with different loads. At this point, the electric motors 12, 16 stay at an idle state.

When the plate clutch assembly 13 is at an engaged state, propulsive forces of the engine 11 are combined with propulsive forces generated by one or both of the electric motors 12, 16. Then the combined propulsive forces are outputted to the transmission 15, shifted by the transmission 15 and then transmitted to loads. At this point, the other electric motor that does not generate propulsive forces can stay at an idle state.

When the plate clutch assembly 13 is at an engaged state, propulsive forces of the engine 11 are outputted to the transmission 15, shifted by the transmission 15 and then transmitted to loads. At this point, one of the electric motors 12, 16 functions as an electric generator for generating electric power so as to charge the battery. The electric motor that does not function as an electric generator can stay at an idle state.

When the plate clutch assembly 13 is at an engaged state, the engine 11 is at an idle state. At this point, one or both of the electric motors 12, 16 function as an electric generator for converting inertia forces generated while decreasing the vehicle speed or residual propulsive forces while braking the vehicle into electric power for charging the battery. The electric motor that does not function as an electric generator can stay at an idle state.

Through the above functions, the vehicle having the hybrid propulsion system 1A can make its engine stopped when the vehicle stops or when the vehicle is idle. The vehicle can be started up at a low speed by the electric motor 12. The vehicle moving at a high speed can be driven by the engine 11. When the vehicle accelerates, the electric motor 12 or 16 can output propulsive forces for assisting the engine 11. When the vehicle decelerates or brakes, the electric motor 12 or 16 functions as an electric generator so as to convert the propulsive forces into electric power. The above functions are helpful to save fuel. In addition, the electric motor 12 rotating in reverse can provide propulsive forces for backing the vehicle, thereby eliminating the need of a backing mechanism in the transmission 15 and accordingly reducing cost. In addition, the system not only can generate electric power while the vehicle moves, even if the vehicle stops, the electric motor 16 can convert propulsive forces from the engine 11 into electric power, thereby increasing functionality of the present hybrid propulsion system.

FIG. 2 shows a modular hybrid propulsion system 1B according to a second embodiment of the present invention. The electric motor 16 in FIG. 1 is used to assist the engine 11. Thus, the electric motor 16 is disposed on the output shaft 111 of the engine 11. Different from the electric motor 16 of FIG. 1, an electric motor 17 in FIG. 2 is disposed on a back shaft 113 opposing to the output shaft 111 of the engine 11. However, the electric motors 16, 17 have same function.

The electric motor 17 comprises a casing 171 fixed to one side of the engine 11 opposing to the output end thereof, a stator 172 fixed inside the casing 171, and a rotor 173 enclosed by the stator 172. The rotor 173 is disposed on the back shaft 113 of the engine 11 and rotates coaxially and synchronously with the back shaft 113. The stator 172 is connected to the battery through the power line 174. Controlled by an electronic controller, the electric motor 17 can function as an electric generator, function as an electric motor, or stay at an idle state. Therefore, the modular hybrid propulsion system 1B have same hybrid propulsion functions as the modular hybrid propulsion system 1A. However, since the electric motor 17 is disposed on the back end of the engine 11, it can facilitate the assembly, maintenance and it is helpful to obtain a better heat dissipating effect.

If the electric motor 12 is eliminated from the hybrid propulsion system 1A, an assist hybrid propulsion system 1C is obtained, as shown in FIG. 3A, the functions of which is described as follows.

When the plate clutch assembly 13 is at a disengaged state and the engine 11 is stopped, the electric motor 16 generates propulsive forces to start up the engine 11 and make the engine 11 idle or generate propulsive forces.

When the plate clutch 13 is at a disengaged state, propulsive forces of the engine 11 propels the electric motor 16 to generate electric power so as to charge the battery of the vehicle.

When the plate clutch assembly 13 is at an engaged state, propulsive forces of the engine 11 are outputted to the transmission 15, shifted by the transmission 15 and then transmitted to loads. At this point, the electric motor 16 can be at an idle state.

When the plate clutch assembly 13 is at an engaged state, propulsive forces of the engine 11 are outputted to the transmission 15, shifted by the transmission 15 and then transmitted to loads. At this point, the electric motor 16 functions as an electric generator for charging the battery of the vehicle.

When the plate clutch assembly 13 is at an engaged state, propulsive forces of the engine 11 and electric motor 16 are combined and outputted to the transmission 15, shifted by the transmission 15 and then transmitted to loads. Such a function can be used at different speed and different loads, especially when the vehicle needs to be accelerated.

When the plate clutch assembly 13 is at an engaged state, the electric motor 16 functions as an electrical generator for converting inertia forces while decreasing the vehicle or residual propulsive forces while braking the vehicle into electric power so as to charge the battery.

Through the above functions, the vehicle having the present propulsion system can make its engine stopped when the vehicle stops or the vehicle is idle. By starting up the engine 11 through the electric motor 16, the vehicle can be started up at a low speed. The vehicle moving at a high speed can be driven by the engine 11. When the vehicle accelerates, the electric motor 16 can output propulsive forces for assisting the engine 11. When the vehicle decelerates or brakes, the electric motor 16 can function as an electric generator so as to convert the propulsive forces into electric power. The above functions are helpful to save fuel. In addition, the system not only can generate electric power while the vehicle moves, even if the vehicle stops, the electric motor 16 can convert propulsive forces from the engine 11 into electric power, thereby increasing functionality of the present hybrid propulsion system.

As mentioned above, the electric motor 16 functions as an assist component for the engine 11. The electric motor 16 can be disposed either on the output shaft 111 or the back shaft 113 of the engine without changing the function thereof. The hybrid propulsion system with the electric motor 16 disposed on the back shaft 113 of the engine 11 is shown in FIG. 3B. The advantage of such is system is that the system is easy to assemble, maintain and has a better heat dissipation effect.

Further, if the electric motor 16 of the hybrid propulsion system 1A is eliminated, another full-function hybrid propulsion system 1D is obtained, as shown in FIG. 4, the functions of which are described as follows.

When the plate clutch 13 is at a disengaged state, propulsive forces generated by the electric motor 12 are outputted to the transmission 15, shifted by the transmission 15 and then transmitted to loads, no matter the engine 11 is stopped, idling or generating propulsive forces.

When the plate clutch 13 is at a disengaged state, reverse propulsive forces generated by the electric motor 12 are outputted to the transmission 15, shifted by the transmission 15 and then transmitted to loads. At this point, only a single kind of propulsive forces is provided to the vehicle for backing the vehicle at low speed with low load, no matter the engine 11 is stopped, idling, or generating propulsive forces. Thus, the transmission 15 does not need a backing mechanism.

When the plate clutch 13 is at a disengaged state, the electric motor 12 converts inertia forces while the vehicle decelerates and propulsive forces while the vehicle brakes into electric power so as to charge the battery, no matter the engine 11 is stopped, idling, or generating propulsive forces.

When the plate clutch 13 is at a disengaged state, the electric motor 12 generate propulsive forces to propel the vehicle to a certain speed. Then, the plate clutch 13 is changed to an engaged state, inertia forces of the vehicle propels the engine 11 to rotate such that the engine 11 can be started up. Thus, the start-up mechanism of the engine 11 such as start-up motors and start-up gears becomes unnecessary.

When the plate clutch 13 is at an engaged state, propulsive forces of the engine 11 is outputted to the transmission 15, shifted by the transmission 15 and transmitted to loads. At this point, the electric motor 12 stays at an idle state.

When the plate clutch 13 is at an engaged state, propulsive forces of the engine 11 is combined with the propulsive forces of the electric motor 12, outputted to the transmission 15, shifted by the transmission 15 and transmitted to loads.

When the plate clutch 13 is at an engaged state, propulsive forces of the engine 11 is outputted to the transmission 15, shifted by the transmission 15 and transmitted to the load. Meanwhile, the electric motor 12 functions as an electrical generator for charging the battery.

When the plate clutch 13 is at an engaged state, the engine 11 is at an idle state. The electric motor 12 converts inertia forces when the vehicle decelerates and residual propulsive forces when the vehicle brakes so as to generate electric power for charging the battery.

Figure 5:
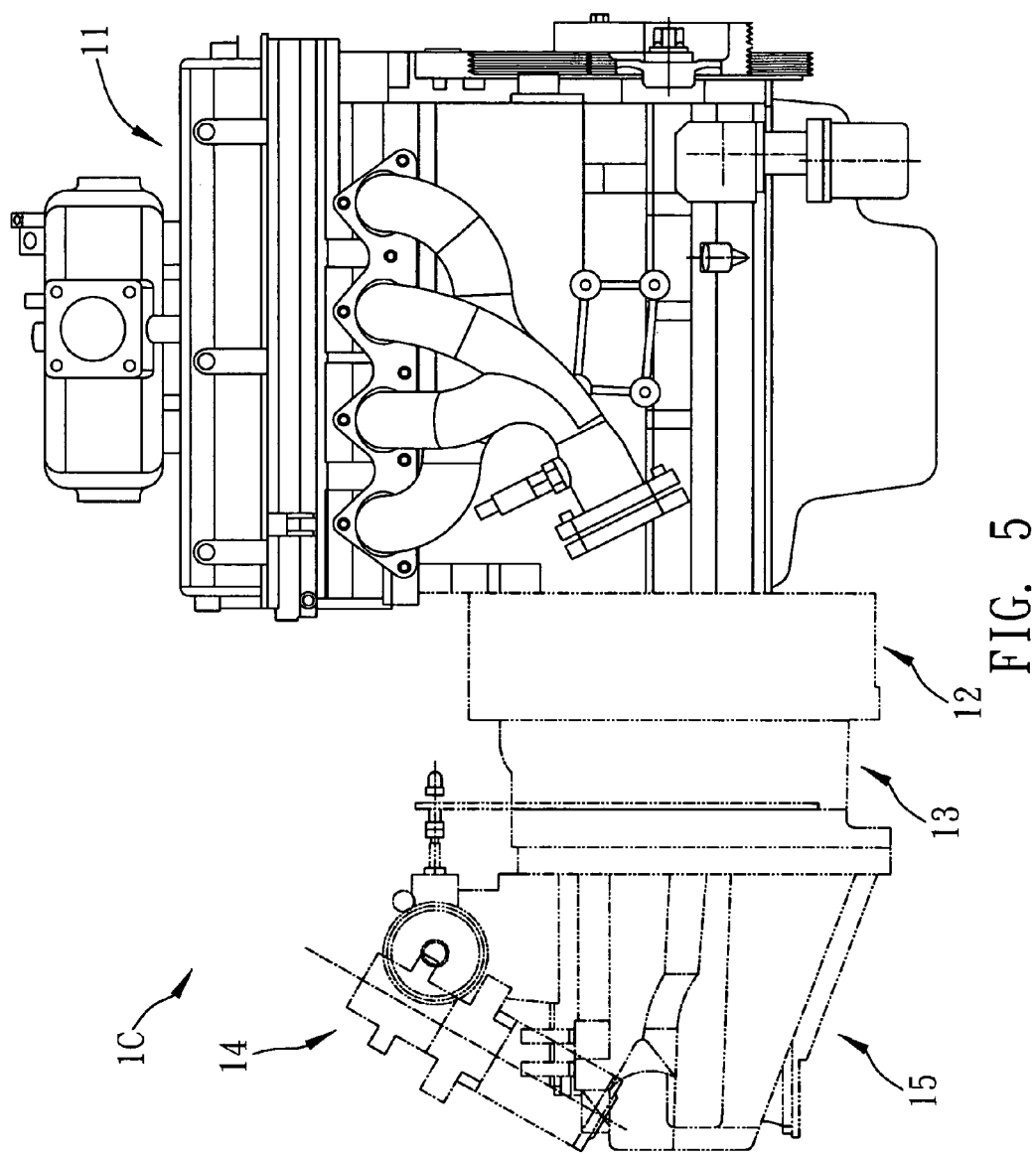
FIG. 5 is a construction diagram of a hybrid propulsion system according to the third embodiment of the present invention.
Figure 6:
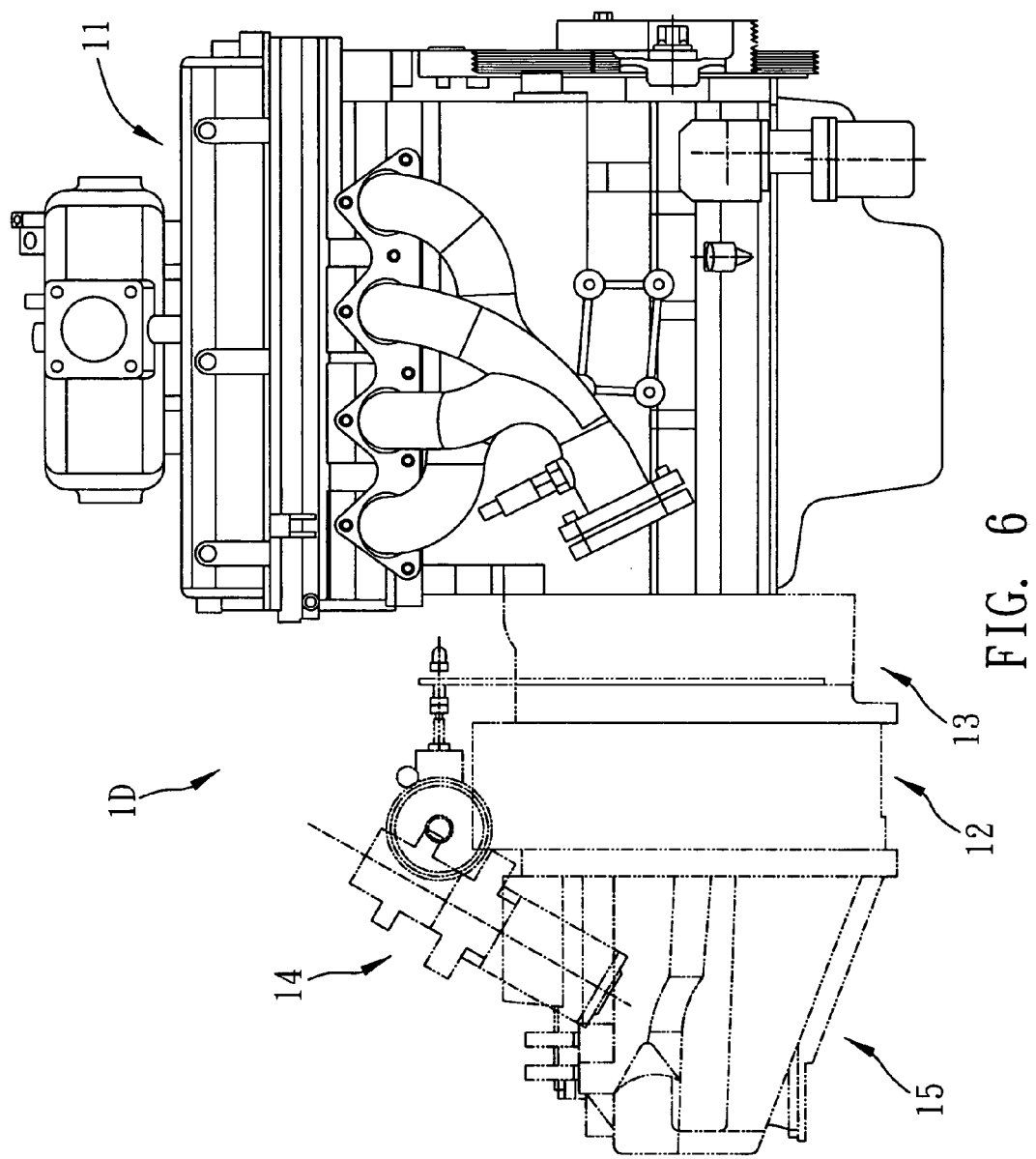
FIG. 6 is a construction diagram of a hybrid propulsion system according to the fourth embodiment of the present invention.

FIGS. 5 and 6 respectively show construction diagrams according to the third and fourth hybrid propulsion systems. Actually, the vehicle can be provided with other components and control systems so as to build a complete hybrid propulsion vehicle.

Figure 7:
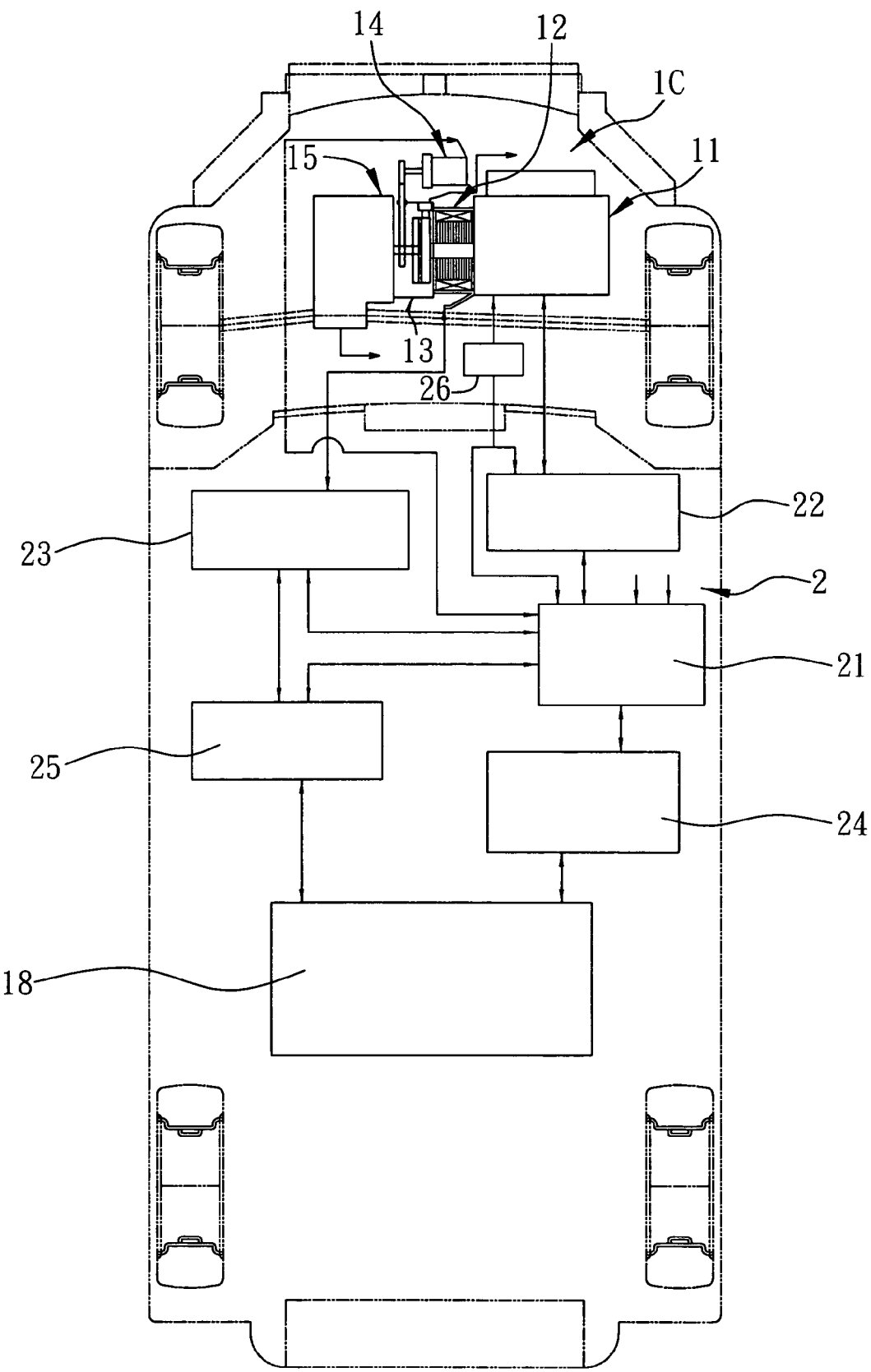
FIG. 7 is a top view of a vehicle having a hybrid propulsion system according to the third embodiment of the present invention.

FIG. 7 shows a top view of a vehicle with a hybrid propulsion system according to the third embodiment of the present invention. The hybrid propulsion system 1C comprises an engine 11, an electric motor 12, a plate clutch 13, a electric actuator 14 and a transmission 15. An electronic control system 2 is used to control the engine 11, the electric motor 12 and the electric actuator 14 such that the hybrid propulsion system can have special functions at different circumstances, thereby saving fuel and obtaining optimal drive and control effect.

The present embodiment further comprises a primary battery 18 that can provide electric power to the electric motor 12 and can be charged by the electric motor 12. A battery control unit 24 is provided to control current and voltage of the primary battery 18 so as to maintain the battery 18 at an optimal electric power range and safe state. Further, a DC/DC converting module 25 is used to convert a higher voltage of the primary battery 18 into a lower voltage needed by general vehicle circuit and controller. In addition, a motor control unit 23 is used to control operation state of the electric motor 12 such as the torque value and output current value of the electric motor.

An engine control unit 22 is used to receive an accelerating or decelerating signal transmitted by a throttle position sensor 26 so as to control state of the engine 11 and output torque rotation speed value. A vehicle control unit 21 can use the propulsion position sensing signal transmitted by the hybrid propulsion system and the vehicle speed sensing signal transmitted by the drive system for judging. The vehicle control unit 21 can be communicated with the battery control unit 24, the motor control unit 23 and engine control unit 22 through network. For different hybrid propulsion systems of the present invention, parameters of the control software need to be slightly changed so as to obtain an optimal effect.

Figure 8:
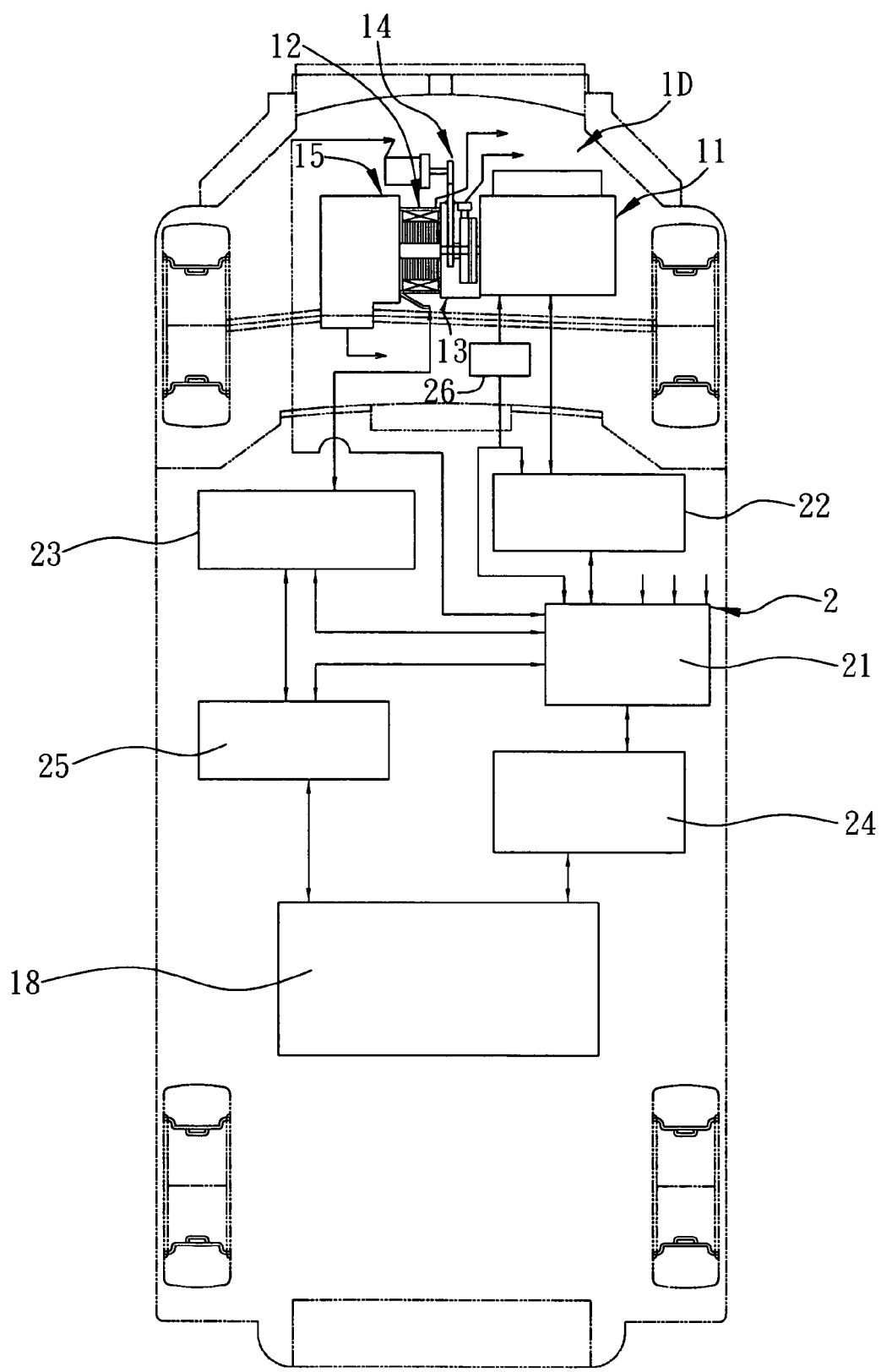
FIG. 8 is a top view of a vehicle having a hybrid propulsion system according to the fourth embodiment of the present invention.

FIG. 8 is a top view of a vehicle having a hybrid propulsion system according to the fourth embodiment of the present invention. The hybrid propulsion system ID comprises an engine 11, an electric motor 12, a plate clutch module 13, a electric actuator 14 and a transmission 15. An electronic circuit control system 2 is used to control the engine 11, the electric motor 12 and the electric actuator 14 such that the hybrid propulsion system can have special functions at different circumstances, thereby saving fuel and obtaining optimal drive and control effect.

The present embodiment further comprises a primary battery 18 that can provide electric power to the electric motor 12 and can be charged by the electric motor 12. A battery control unit 24 can control current and voltage of the primary battery 18 so as to maintain the battery at an optimal electric power range and safe state. Further, a DC/DC converting module 25 is used to convert a higher voltage of the primary battery 18 into a lower voltage needed by general vehicle circuit and controller.

In addition, a motor control unit 23 is used to control operation state of the electric motor 12 such as the torque value and output current value of the electric motor. An engine control unit 22 is used to receive an accelerating or decelerating signal transmitted by a throttle position sensor 26 so as to control state of the engine 11 and output torque rotation speed value. A vehicle control unit 21 can use the propulsion position sensing signal transmitted by the hybrid propulsion system and the vehicle speed sensing signal transmitted by the drive system for judging. The vehicle control unit 21 can be communicated with the battery control unit 24, the motor control unit 23 and engine control unit 22 through network. For different hybrid propulsion systems of present invention, parameters of the control software need to be slightly changed to obtain an optimal effect.

According to the hybrid propulsion system of the present invention, an electric motor is used to drive the lever mechanism of the plate clutch. Thus, connection between the sources of propulsive forces and the transmission, or connection between different sources of propulsive forces such as between the engine and the electric motor can be separated or reunited automatically, thereby achieving different hybrid propulsion systems having different functions. Meanwhile, the hybrid propulsion systems can easily be constructed with modular components, and the plate clutch is an already known and low cost mechanism. Therefore, a low cost hybrid propulsion system with simple structures and multi functions can be achieved so as to save fuel, enhance output power and obtain optimal operation performance.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A vehicle hybrid propulsion system, comprising:
an engine for generating a propulsive force;
an electric motor for generating a propulsive force, generating electricity or idling;
an output shaft connected to the engine and the electric motor for outputting the propulsive force;
a plate clutch connected to the output shaft and having a motor and a lever mechanism, the lever mechanism including a push rod driven by the motor via a fulcrum, a lever propelled by the push rod, and a thrust ring propelled by the lever and exerting forces on the plate clutch, the lever being disposed between the thrust ring and the push rod, and the thrust ring being disposed between the fulcrum and the push rod; and
a transmission having an input shaft connected to the plate clutch for inputting the propulsive force, and having an output shaft for outputting the propulsive force to a load, wherein the plate clutch is used for separating the transmission from the engine or coupling the transmission with the engine.

2. The vehicle hybrid propulsion system of claim 1, further comprising an electronic controller for making the electric motor perform one of the operations consisting of generating propulsive forces, generating electricity and idling.

3. The vehicle hybrid propulsion system of claim 1, wherein the transmission is one of a manual transmission and an automatic transmission.

4. A vehicle hybrid propulsion system, comprising:
an engine for generating a propulsive force;
a plate clutch having a lever mechanism driven by a motor, the lever mechanism including a push rod driven by the motor, a lever propelled by the push rod via a fulcrum, and a thrust ring propelled by the lever and exerting forces on the plate clutch, the lever being disposed between the thrust ring and the push rod, and the thrust ring being disposed between the fulcrum and the push rod;
an output shaft connected to the engine and the plate clutch for outputting the propulsive force;
an electric motor connected to the output shaft and disposed on an output of the engine for generating a propulsive force, generating electricity or idling; and
a transmission having an input shaft connected to the plate clutch for inputting the propulsive force, and having an output shaft for outputting the propulsive force to a load.

5. The vehicle hybrid propulsion system of claim 4, further comprising an electronic controller for making the electric motor perform one of the operations consisting of generating propulsive forces, generating electricity and idling.

6. The vehicle hybrid propulsion system of claim 4, wherein the transmission is one of a manual transmission and an automatic transmission.

7. A vehicle hybrid propulsion system, comprising:
an engine for generating a propulsive force;
a first electric motor for generating a propulsive force or generating electricity;
a first output shaft connected to the engine for outputting the propulsive force;
a transmission connected to the first electric motor, having an input shaft connected to the first output shaft, and having a second output shaft for outputting the propulsive force to a load;
a second electric motor connected to the first output shaft and disposed on an output of the engine for generating a propulsive force or generating electricity;

a plate clutch connected to the first output shaft and the input shaft, disposed between the first electric motor and the second electric motor, and having a motor and an actuating mechanism for separating the engine from the transmission or coupling the engine with the transmission; and a lever mechanism including a push rod driven by the motor of the plate clutch, a lever propelled by the push rod via a fulcrum, and a thrust ring propelled by the lever and exerting forces on the plate clutch, the lever being disposed between the thrust ring and the push rod, and the thrust ring being disposed between the fulcrum and the push rod.

8. The vehicle hybrid propulsion system of claim 7, further comprising an electronic controller for making the first electric motor and the second electric motor perform one of the operations consisting of generating propulsive forces, generating electricity and idling.

9. The vehicle hybrid propulsion system of claim 8, wherein the electronic controller further controls forward and reverse cycling of the first electric motor so as to move a vehicle forward or backward.

10. The vehicle hybrid propulsion system of claim 7, wherein the transmission is one of a manual transmission and an automatic transmission.

11. The vehicle hybrid propulsion system of claim 7, wherein output power of the first electric motor is more than output power of the second electric motor.

* * * * *